J. H. CAIRNS.
GATE.
APPLICATION FILED JUNE 7, 1918.
1,292,248.
Patented Jan. 21, 1919.
3 SHEETS—SHEET 1.
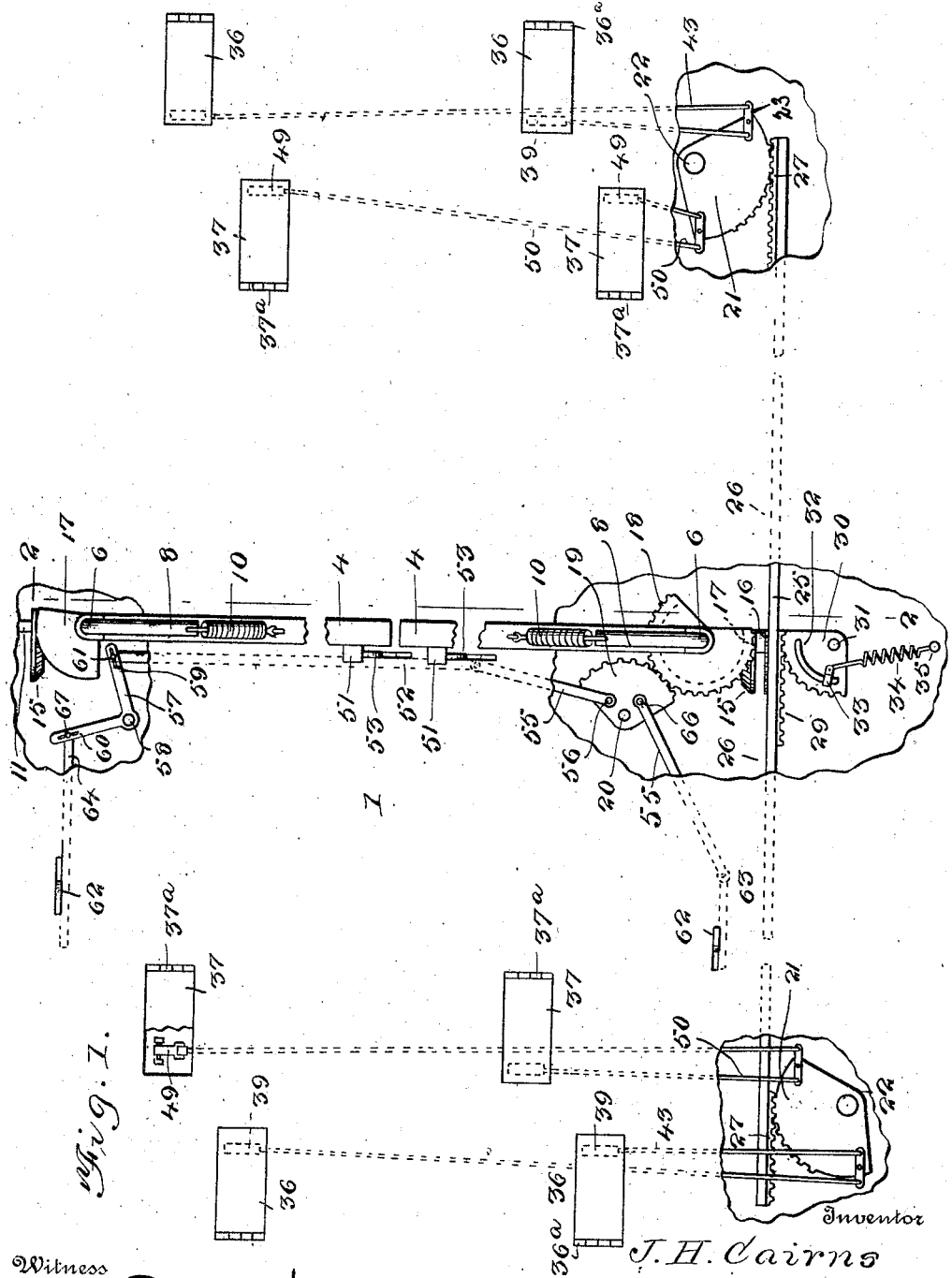
Inventor
J. H. Cairns
By Victor J. Evans
Attorney
Witness
E. R. Ruppert

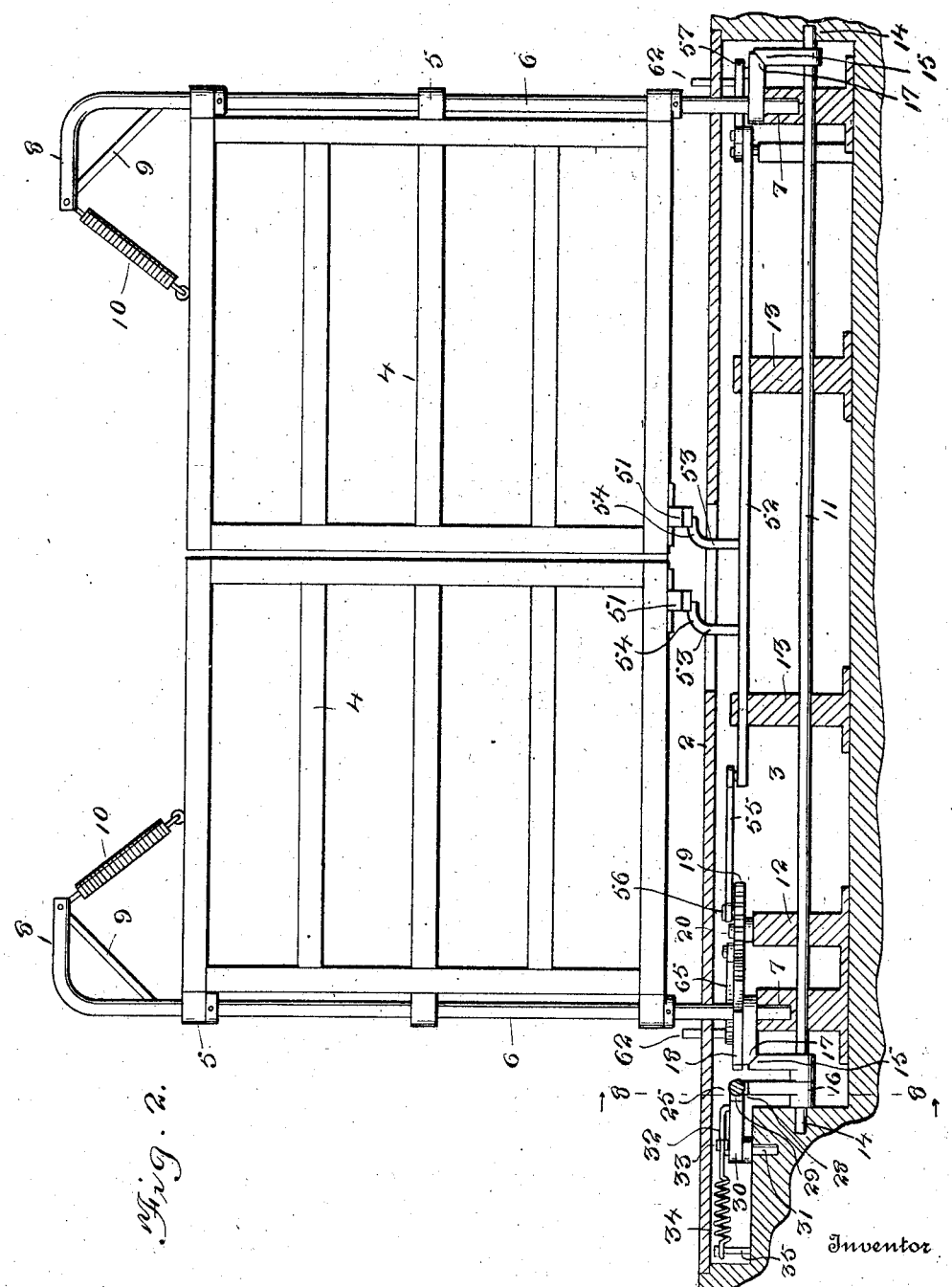

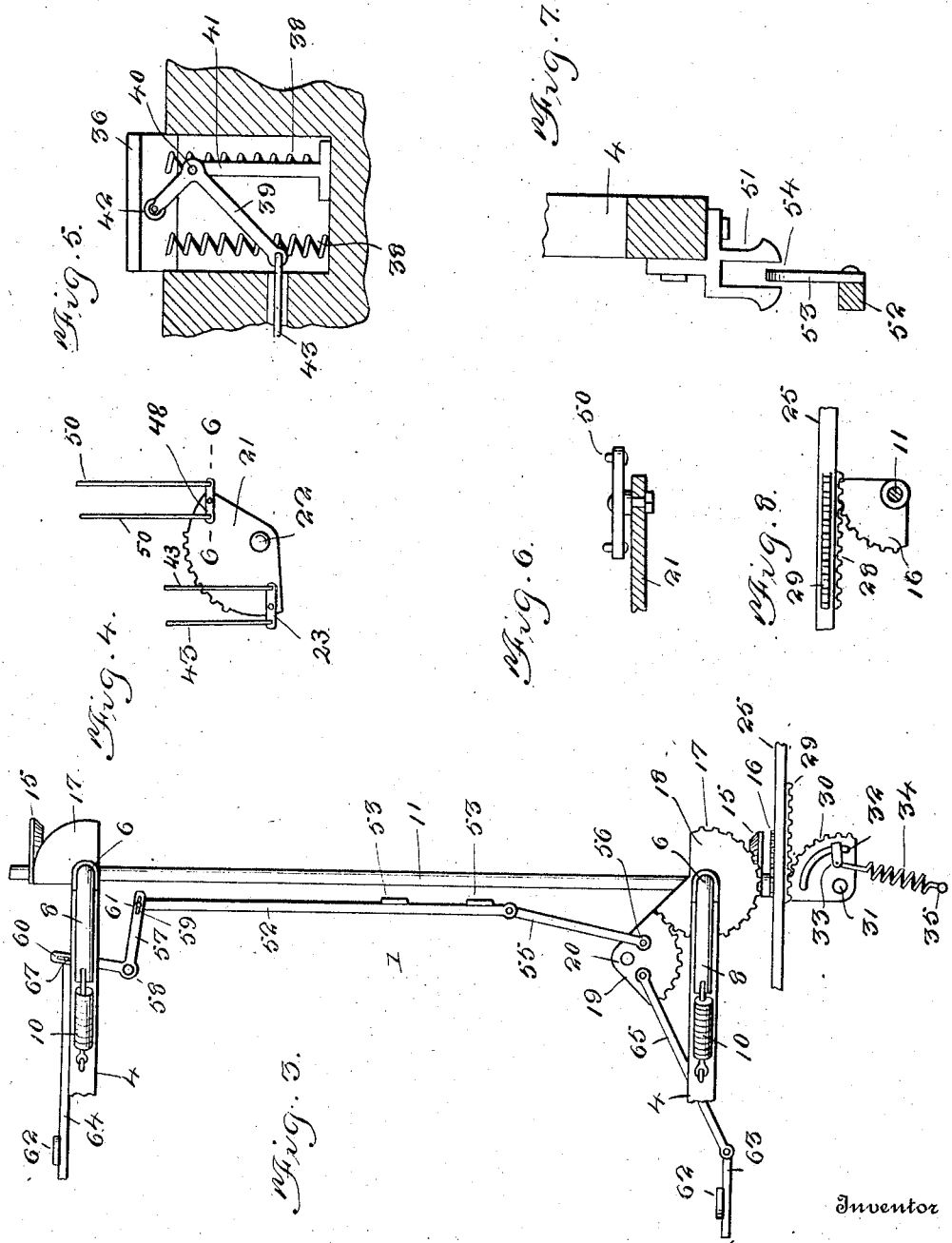

UNITED STATES PATENT OFFICE.

JOHN H. CAIRNS, OF LA SALLE, ILLINOIS.

GATE.

1,292,248.  Specification of Letters Patent.  Patented Jan. 21, 1919.

Application filed June 7, 1918. Serial No. 238,780.

*To all whom it may concern:*

Be it known that I, JOHN H. CAIRNS, a citizen of the United States, residing at La Salle, in the county of La Salle and State of Illinois, have invented new and useful Improvements in Gates, of which the following is a specification.

This invention relates to improvements in gates, such as farm gates and especially with reference to the provision of automatically operating means, actuated by the wheels of a vehicle for opening and closing a gate and for holding the same in open or closed position and so that the gate is caused to automatically open as a vehicle approaches the gate and to close after the vehicle has passed through the gate.

The object of the invention is to provide improved gate operating means of this kind which is simple in construction, is positive and automatic in operation, which may be readily installed, and which is not likely to get out of order.

With the above and other objects in view, the invention consists in the construction, combination and arrangement of devices hereinafter described and claimed.

In the accompanying drawings:—

Figure 1 is a plan of a gate and gate operating means constructed and arranged in accordance with my invention, and showing the gate in closed position.

Fig. 2 is an elevation of the gate and a cross section of the platform and gateway on the plane indicated by the line 2—2 of Fig. 1.

Fig. 3 is a detail plan of the gate operating means and also shows the gate leaves in open position.

Fig. 4 is a similar view, on a larger scale, of one of the prime moving segment gears and its connections.

Fig. 5 is an end elevation of one of the treads and its connections, and showing a portion of the base or gate or roadway in section.

Fig. 6 is a detailed sectional view on the plane indicated by the line 6—6 of Fig. 4.

Fig. 7 is a detailed sectional view of the gate and of one of the holding means therefor.

Fig. 8 is a detail view of the connecting bar and one of the segment pinions.

A gateway is indicated at 1 and is here shown as provided with a platform 2 under which is an excavation 3 in which the gate operating mechanism is installed. The gate comprises a pair of leaves 4 which may be of the construction here shown or of any suitable construction and each of which is mounted as at 5 for turning movement on a vertical standard 6, the said standards being also mounted for turning movement independently of the gate leaves and supporting bearings 7 being here shown in which the lower ends of the gate standards are mounted. Each gate standard has a horizontal arm 8 at its upper end, to partly extend over the gate leaf attached to said standard and preferably each standard also has a brace 9 for its arm 8. Coiled retractile springs 10 connect the gate leaves to the standard arms 8, the said springs serving to normally keep and hold the gate leaves in line with the standard arms before permitting the standard to turn to some extent independently of the gate leaves as will be understood.

A rock shaft 11 which extends across the gateway and in line with and below the gate standards is mounted in the bearings 7 and is also mounted in bearings which are provided in pillow blocks 12 and 13. The ends of the rock shaft are here shown as mounted in bearings 14. Secured to the rock shaft for turning movement therewith and arranged near the ends of said shaft are miter segment gears 15 and near one end of said shaft is also secured a segment pinion 16. The gate standards are provided near their lower ends with segment miter gears 17 which engage the gears 15 and one of said standards is also provided with a segment spur gear 18 which engages a corresponding segment spur gear 19 which is here shown as mounted on a vertical stub shaft 20 which projects from the upper end of the pillow block 12.

Under one side of the gate or roadway and at points spaced a suitable distance from opposite sides of the gate are prime moving segment gears 21 which are horizontally arranged and are mounted on suitable bearings as at 22. A connecting bar 25 of suitable length extends along the same side of the gate or roadway and is arranged for longitudinal movement, suitable supporting guides 26 being here shown as provided therefor.

Said connecting bar is provided at its ends with racks 27 which engage the prime moving gears 21 and is provided also, at its center, with a rack 28 which engages the gear 16. On one side and at its center said bar is also provided with a rack 29 which engages a detent segment gear 30 said detent segment gear being horizontally arranged, its vertical shaft being indicated at 31, and said gear 30 is provided on its upper side with a segmental traveler rod 32 on which a ring 33 is slidably fitted. A detaining spring 34, which is a coiled retractile spring, has one end secured at a fixed point at 35 in line with the gate standards, the other end of said spring being attached to the ring 33. Said spring yields to permit partial rotation of the gear 30 and in connection with the ring and the traveler rod serves to detain and hold said gear at the limit of its movement in either direction.

It will be understood from the foregoing that the gears 21, rod 25 and gear 16 cause the rock shaft 11 to be turned in one direction or the other when either of the prime moving gears 21 is turned, and hence the gate will be opened or closed, the turning movements of the standard 6, which are communicated thereto from the shaft 11 by the gears 15 and 17 causing the arms 8 and the spring connections 10 between said arms and the gates to turn the latter with and to some extent independently of the standards.

In order to cause the prime moving segment gears 21 to be operated by the wheels of a vehicle in approaching the gate from either direction or leaving after passing through the gate, I provide a pair of gate treads 36 and a pair of gate closing treads 37 at either side of the gate, the gate opening treads being nearer the right hand side of the road, in either direction, than the left hand treads. In other words, the gate opening treads 36 at one side of the gate are substantially in line with the gate closing treads at the opposite side of the gate, so that the wheels of a wagon or other vehicle in approaching the gate from either side may be readily caused to pass over a pair of the gate opening treads and to pass over a pair of the gate closing treads after having passed through the gate. The gate opening and closing treads are pivotally mounted at one end as at 36ª, 37ª, respectively, and springs 38 are provided which serve to raise the free ends of the treads so that each tread is normally held in an inclined position, the free ends of the opening treads extending toward the gate from opposite sides and the free ends of the closing treads extending from the gate, as indicated clearly in Fig. 1 of the drawing. Under each gate opening tread is a bell crank lever 39 having a long arm and a short arm and said bell crank lever is pivotally mounted, as at 40, on a standard 41. The short arm of the bell crank lever has a roller 42 which bears under the gate opening tread and the long arm of said lever is connected by a rod 43 to an element 23 which is pivotally mounted on one of the prime moving gears 21.

The gate closing treads 37 operate bell crank levers 49 which are identical in construction with the bell crank levers 39 and the long arms of which are connected by rods 50 to the elements 48 which are pivotally mounted on the prime moving gears 21.

When the wheels of a vehicle in approaching the gate pass over the treads 36 said treads are depressed, thereby causing the bell crank levers 39 to be turned and the rods 43 and element 23 to turn the prime moving gear 21 in the required direction to move the rod 43 endwise, said rod and the coacting elements hereinbefore described serving to thereby cause the gates to open.

As the vehicle passes over the closing treads after having passed through the gate, said closing treads are depressed and the rods 50 impart reverse partial rotation to the other gear 21 and thus move a rod 25 in the reverse direction and cause the gates to be reclosed.

I also provide means to hold the gate against casual movement when in either closed or open position, such gate holding means being described as follows: The gate leaves or members are each provided on its under side with a substantially U-shaped keeper 51, said keepers being near the free ends of the gate members, as shown. A longitudinally movable rod 52 is arranged for movement through guide openings in the elements 13 and is provided with a pair of upwardly extending yieldable latches 53 each of which has a horizontally bent arm 54 at its upper end, the said arms being adapted to enter the notches formed in the lower sides of the keepers 51, to hold the gate members. The said rod 52 is connected by a rod 55 with the gear 19, as at 56, so that said rod 52 is operated by said gear. At one side of the gateway is a bell crank lever 57 which is pivotally mounted as at 58 and which has slots 59, 60 in its arms, the rod 52 being connected to one arm of said lever by a pivot 61 which operates in the slot 59. Latches 62 which are identical in construction with the latches 53, are arranged at opposite sides of the gateway, one of them being mounted on a longitudinally movable rod 63 and the other on a rod 64. The rod 63 is connected by a rod 65 to the gear 19 as at 66. The rod 64 is connected to the bell crank lever 57 by a pin 67 which operates in the slot 60.

It will be understood that the gear 19 is turned by the gear 18 when the gate is either opened or closed. Owing to the loose connection between the gate members and the standards 6, and the springs 10, a partial turning movement of the gear 19 is effected before the gate members move and hence the rods 52, 63 and 64 move somewhat in advance of the movement of the gate members. Assuming that the gate members are in closed position such initial turning movement of the gear 19 will cause the rod 52 to move the latches 53 out of engagement with the keepers 51 the gates will then open and during their opening movement the rods 63 and 64 will be actuated to put the arms of the latches 62 in the required position to snap into said keepers 51 as the gates reach a fully open position, and serve to hold the same in such position.

While I have herein shown and described a preferred embodiment of my invention, I would have it understood that changes may be made in the form, proportion and construction of the several parts, without departing from the spirit of my invention, and within the scope of the appended claims.

Having thus described my invention, I claim:—

1. In combination with a gate, a standard mounted for turning movement and on which the gate is mounted for independent swinging movement, means to turn the standard to swing the gate, said gate having a keeper, and gate detaining means to hold the gate against casual movement when open or closed, said gate detaining means comprising slidably mounted catches and a gear wheel to which said catches are connected for movement thereby, the gate standard being provided with a gear which engages the first named gear.

2. In combination with a gate, a standard mounted for turning movement and on which the gate is mounted, a rock shaft geared to the standard and provided with a pinion, prime moving pinions mounted at points spaced from opposite sides of the gate, a longitudinally movable connecting bar having racks engaging the pinion on the rock shaft and said prime moving gears, and tread members for engagement and operation by the wheels of vehicles, and connections between said tread members and said prime moving gears, to actuate said gears and thereby cause the gate to be opened and closed by passing vehicles.

3. In combination with a gate carrying standard mounted for turning movement and means to turn the same to open or close the gate, a detent element mounted for pivotal movement and geared to said standard, the pivot of the said element being in line with the standard and gate, and said element having a segmental traveler, a ring engaging said traveler, and a detaining spring having one end secured at a fixed point and the other end connected to said ring.

In testimony whereof I affix my signature.

JOHN H. CAIRNS.